Oct. 8, 1957 F. MORANDI 2,808,648
SPRING-CLAMP JOINT FOR RELEASABLY SECURING ARTIFICIAL TEETH
Filed June 22, 1955 3 Sheets-Sheet 2

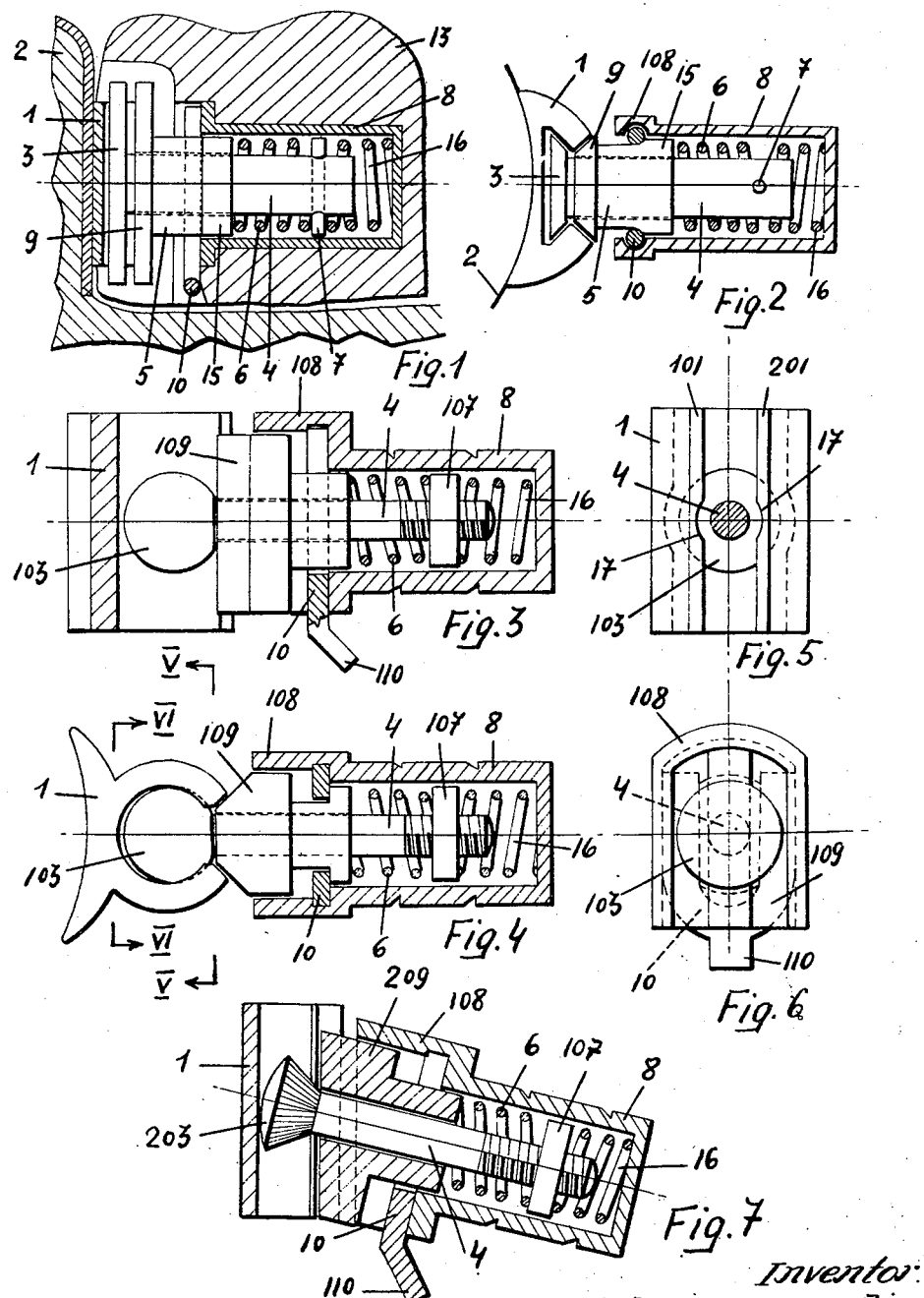

Inventor:
Federico Morandi.
Attorney

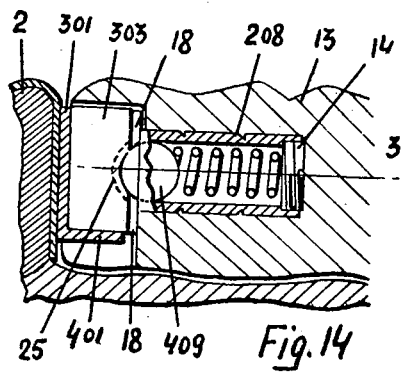
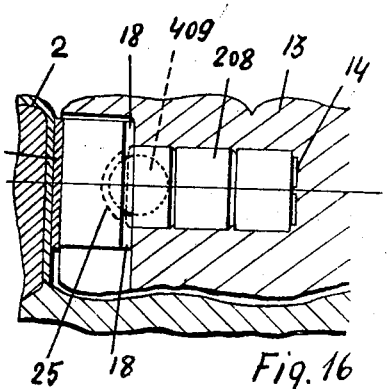
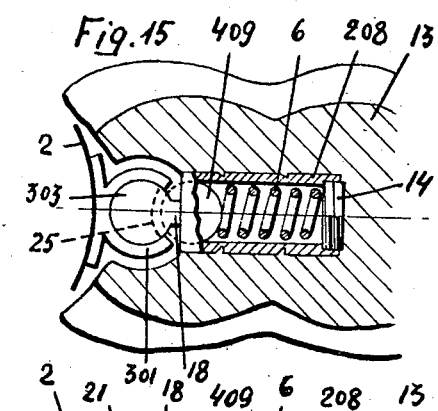
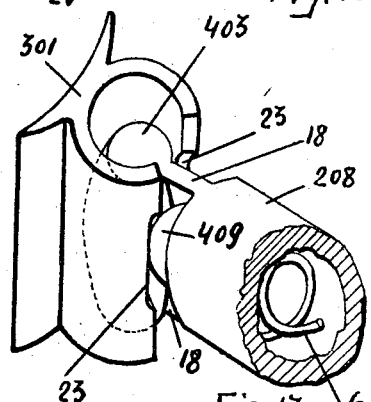
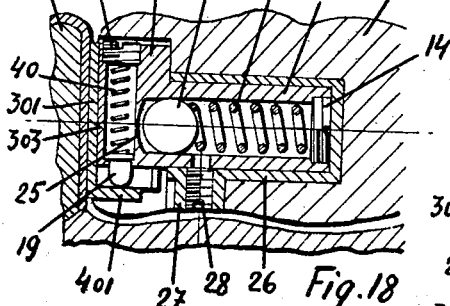
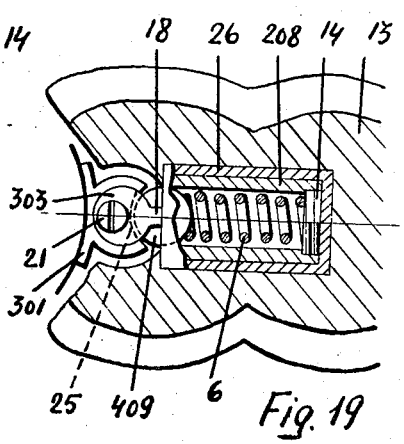

United States Patent Office 2,808,648
Patented Oct. 8, 1957

2,808,648
SPRING-CLAMP JOINT FOR RELEASABLY SECURING ARTIFICIAL TEETH

Federico Morandi, Bologna, Italy

Application June 22, 1955, Serial No. 517,180

13 Claims. (Cl. 32—9)

This invention relates to invisible spring clamp joints for releasably securing artificial teeth or partial dental prostheses to a pillar tooth, which is provided with a cap carrying a longitudinally grooved socket of the dovetail joint type, viz. a socket whose walls converge towards a longitudinal slot, whereas the artificial tooth adjacent to the pillar tooth carries in its interior a spring clamp provided with a projecting outer head to be inserted in the dovetail socket and a counter head pressed by spring means towards said outer head, so that the said head and counter head act like the jaws of a clamp, whereby when said outer head is fitted to the said dovetail socket, the counter head tends always to clamp the edges of the socket groove and the whole joint tends to draw the artificial tooth in which the clamp is inserted against the pillar tooth while permitting all angular and distal movements of the false tooth or teeth with respect to the pillar tooth and to the alveolar ridges of the underlying gums.

The improvements according to the invention will be better understood by the following specification, taken in connection with the attached drawings in which:

Figures 1 and 2 show two sections at right angles through a first embodiment of a spring clamp for a partial dental prosthesis, releasably secured by means of a dovetail joint to a pillar tooth.

Figures 3 and 4 are two sections at right angles through a second embodiment of spring clamp.

Figure 5 is a section on line V—V of Figure 4.

Figure 6 is an end view of the clamp from the line VI—VI of Figure 4.

Figure 7 is a modification of the clamp shown in Figure 3.

Figures 14 and 15 are two sections at right angles through a seventh embodiment of spring clamp.

Figure 16 is a partial section through a variation of the embodiment shown in Figure 14.

Figure 17 is a perspective view with parts broken away of a variation of a joint shown in Figure 16.

Figures 18 and 19 are two sections at right angles of an eighth embodiment of the spring clamp, and Figure 20 shows a modified form of one of the clamp members.

Figure 8:
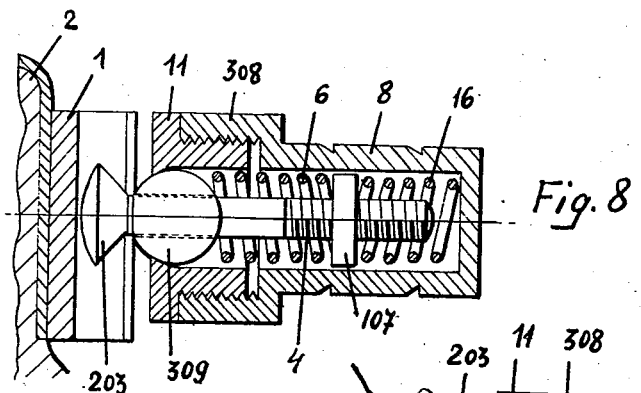
Figures 8 and 9 are two sections at right angles through a fourth embodiment of spring clamp.

The spring clamp joint serving for anchoring the false teeth comprises a so-called dovetail socket 1 which is fastened in a known manner to the cap fitted to a pillar tooth 2 and the spring clamp attachment proper which will be described hereinafter; whereby the term "dovetail socket" shall include all sockets having a longitudinal groove provided with converging walls, which may be either plane or curved, in which case the socket is in the form of a cylinder provided with a longitudinal slot.

According to the embodiment shown in Figures 1 and 2 the spring clamp to be anchored to the socket 1 comprises a substantially cylindrical shell or housing 8 to be fitted in a false tooth 13. The shell 8 is closed at its inner end and open at its outer end which faces the socket 1. Within the shell 8 is fitted a shank 4 provided with a head 3 whose shape is such as to fit in the corresponding dovetail socket 1, a bushing 5 slidable on said shank 4 and provided with a counter-head 9 whose shape is such as to snugly fit against the outer edges of the dovetail groove, and a compressed helical spring 6 bearing with one of its ends against the end of the bushing 5 and by its other end against an abutment on the shank 4, such as a pin 7 inserted in a diametral hole in the shank 4. A light helical spring 16 is disposed around the end of the shank 4 between the abutment 7 and the inner end of the shell 8. The bushing 5 has an enlarged rear part 15 while the shell 8 is provided at its open end with an U-shaped mouthpiece 108 provided inwardly with parallel grooves in which a forked pin 10 may be inserted. Thus, when the clamp unit is inserted into the shell 8 and the spring 16 is slightly compressed until the enlarged part 15 of the bushing 5 passes beyond the groove of the mouthpiece 108, by inserting the forked pin 10 into the said grooves, the said members of the clamp are held together.

With a clamp unit thus constructed, it is apparent that, when the head 3 is inserted into the dovetail groove of the socket 1, the counter-head 9, is spring pressed against the outer walls of the said socket and thus the head 3 and counter-head 9 act as the jaws of a spring clamp and tend to maintain the false teeth 13 in their correct position, while permitting any angular and distal movement thereof. Furthermore, the clamp unit may be easily slid off the pillar tooth and then may be dismounted by withdrawing the forked pin 10 and the pin 7.

The embodiment shown in Figures 3, 4, 5 and 6 is like that shown in Figures 1 and 2, with the differences that the dovetail groove is made with curved sides, so as to assume a substantially cylindrical shape, the head 103 is ball-shaped, the counter-head 109 has a prismatic tail portion which is guided between the wings of the U-shaped shell mouth 103, the forked pin 10 is preferably made of sheet metal and is possibly provided with a finger grip 110, the shank 4 is threaded and the abutment is formed by a nut 107 screwed on the threaded end of the shank 4. This nut permits adjusting the compression of the spring 6.

As shown in Figure 5, the edges 101—201 of the walls of the dovetail groove are beveled and provided in an intermediate position with round cuts 17 forming a seat for the head and counter-head 3—9 or 3—109 etc.

The embodiment shown in Figure 7 is like that shown in Figures 3 and 4, with the difference that the head 203 is frusto-conical with rounded base and the counter-head 209 has its part which bears against the socket edges slightly inclined with respect to the hole through which the shank 4 passes. This embodiment is to be adopted whenever it is required that the false tooth is kept slightly pressed against the underlying edentulous gum.

Figure 9:
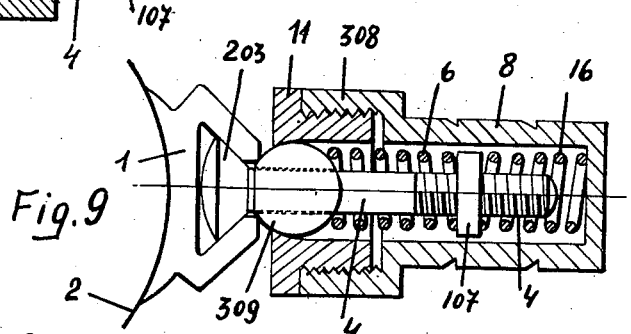

According to the embodiment shown in Figures 8 and 9, the counter-head is constituted by a diametrically perforated ball-like member 309 slidably mounted on the shank 4 which is pressed outwardly by the spring 6 and is retained by an externally screw-threaded nut 11 screwed into a corresponding part 308 of the shell 8 and having a cylindrical bore whose diameter is slightly greater than that of the ball 309, with the exception of its outer end, where it is restricted to substantially less than the diameter of said ball 309, which thus may project thereout by less than one-half. Thus the edges of the slot of the dovetail socket are clamped between the head 203 and the projecting part of the ball 309.

Figure 10:
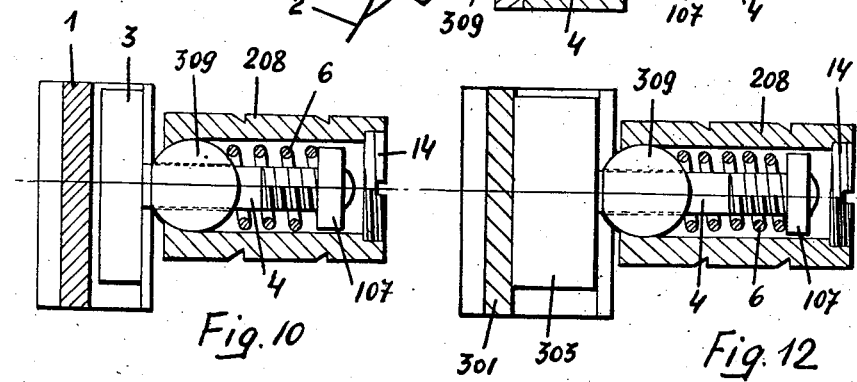
Figures 10 and 11 are two sections at right angles through a fifth embodiment of clamp.
Figure 11:
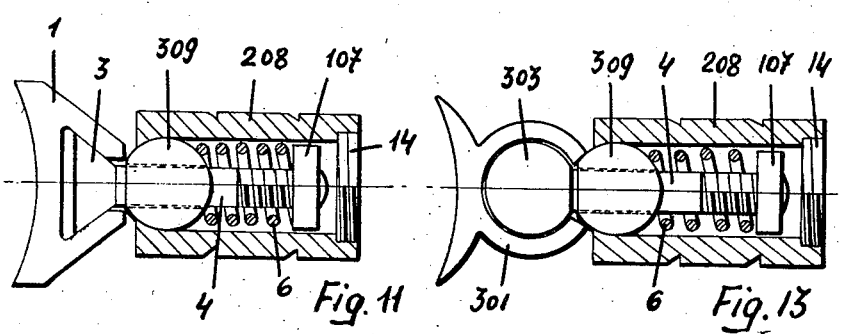

According to the embodiment shown in Figures 10 and 11, the shell 208 has a cylindrical bore one end of which is restricted and the other is screw-threaded. The head-carrying shank 4 is inserted through the restricted shell end and a diametrically perforated ball 309 and a helical spring 6 are slid thereon and then a nut 107 is screwed on the threaded end of the bolt so as to keep the parts 3–4, 309, 6, 107 and 108 together. The shell 108 is closed at the end which is embedded in the false tooth by a screw-threaded disk 14. The head 3 is trapezoidal, and the walls of the dovetail socket 1 are plane.

Figure 12:
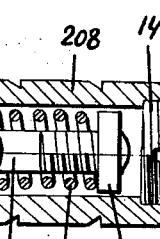
Figures 12 and 13 are two sections at right angles through a sixth embodiment of clamp.
Figure 13:
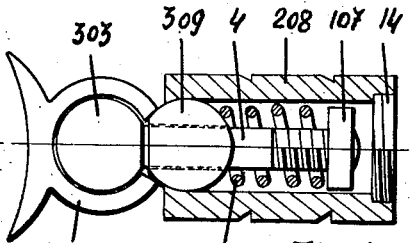

The embodiment shown in Figures 12 and 13 is like that shown in Figures 10 and 11, with the exception that the head 303 is cylindrical and is fitted into a corresponding cylindrical socket 301.

According to the embodiments shown in Figures 14, 15 and 16, the head 303 is cylindrical and, instead of being attached to a stem, is attached by means of two arms or ribs 18 to the cylindrical shell 208, which is formed like those shown in Figures 10 to 13, viz. has a restricted end. In its middle part between the ribs 18 said head 303 has a cavity 25. In the cylindrical shell 208 is inserted a ball 409 (or also a cylindrical or even ovoidal plug 509 with ogival or otherwise convex end, like that shown in Figure 20) and a helical spring 6 which is pressed against the said ball or plug by a threaded disk 14 screwed into the end of the shell 208. Thus the said ball or plug protrudes in part through the restricted open end of the shell 208 and when the head 303 is inserted into the corresponding socket 301 the edges of the groove of the dovetail socket are clamped between head 303 and ball 409.

In the embodiment shown in Figure 17, the head 403 is cask-shaped and the edges of the groove of the dovetail socket are cut for a certain length as shown at 23.

In all the embodiments in which the head of the clamping device is of elongated shape (as in Figure 14) the dovetail socket may be provided with a bottom supporting plate 401 spaced from the underlying edentulous gum and which the lower extremity of the head 303 bears. This arrangement may be useful whenever it is desired that the bases of the artificial teeth remain at least in part spaced from the underlying gums.

The arrangement shown in Figures 18 and 19 is like that shown in Figures 14 and 15 with the difference that, in order to obtain a damping action, the head 303 is provided with an axial bore having a restricted lower end and a screw-threaded upper end. In this bore a slidable plunger 19 (which may be also a partially projecting ball or the like) is inserted, so as to project partially out of the restricted bore end. On this plunger a helical spring 40 is inserted and compressed by screwing the plug 21. This arrangement permits constructing a spring support for the artificial tooth on the bottom plate 401.

In the said Figures 18 and 19 the shell 208 is not directly embedded in an artificial tooth 13 but is inserted into an outer shell 26 embedded in the artificial tooth. This shell is provided with a radial bore or with a radially projecting bored hub 27 in which a screw 28 may be inserted and screwed into a corresponding tapped hole of the shell 208.

This arrangement, which may be adopted also for the other embodiments, permits of easily dismounting the whole clamp from the artificial tooth.

Of course, the improved clamping means for anchoring artificial teeth to a pillar tooth may undergo numerous changes without departing from the spirit of the invention. Thus in Figure 20 there is shown a cylindrical plug 509 provided with an ogival end, which may be employed instead of the balls 409 and which, as it is apparent, may also have a pointed, frusto-conical or otherwise convex end.

I claim:

1. A spring-clamp device for removably securing a dental prosthesis to an anchoring member permanently fixed to a pillar tooth and having an elongate vertically disposed socket and a slot in communication with and extending longitudinally of the socket, said device comprising a cylindrical shell adapted to be permanently fixed to the prosthesis, said shell being open at its outer end and closed at its inner end, an outer clamping head adapted to slidably fit in the socket of the anchoring device, a counterclamping head slidably mounted within said shell, means at the outer end of said shell restricting the open end of said shell to retain said counterhead in said shell with the clamping portion of said counterhead extending beyond the end of said shell, a spring enclosed within said shell and biasing said counterhead outwardly of said shell, and means fixed with said outer head and passing through said slot and connecting said outer head with said shell, whereby said heads are resiliently pressed toward each other to clamp therebetween the opposite sides of the walls of the anchoring member defining the slot.

2. A spring clamp device according to claim 1, in which the outer head is provided with a shank on which the counter-head is slidably mounted and pushed against the said outer head by a helical spring which bears with one of its ends against said counter head and by its other end against an abutment member on said shank.

3. A spring clamp device according to claim 1, in which the outer head is provided with a shank on which the counter head is slidably mounted and pushed against the said outer head by a helical spring which bears by one of its ends against said counter head and by its other end against an abutment member on said shank, a second helical spring between the inner end of the cylindrical shell and said abutment member; said counter head being provided with a bushing slidable on said shank and having at its rear end an enlarged part and said cylindrical shell being provided at its open end with a mouthpiece having parallel grooves in which a forked pin is inserted which abuts by its prongs against the said enlarged part of the said bushing.

4. A spring clamp device according to claim 1, in which the outer head is provided with a shank on which the counter head is slidably mounted and pushed against the said outer head by a helical spring which bears by one of its ends against said counter-head and by its other end against an abutment member on said shank, a second spring between the inner end of said cylindrical shell and the said abutment member, said counter-head being constituted by a body provided with a convex end, said shell being provided with an inwardly threaded mouthpiece at its outer end, an annular plug threaded in said mouthpiece and having a bore the outer end of which is of smaller diameter than the said convex-ended body to retain said counter-head in said shell while permitting its convex end to protrude outwardly, towards said outer head.

5. A spring clamp device according to claim 1, in which the outer head is provided with a shank on which the counter head having a substantially convex end is slidably mounted and pushed against the said outer head by a helical spring which bears by one of its ends against said counter head and by its other end against an abutment member on said shank, said cylindrical shell having an internally threaded opening in its inner end for admitting said counterhead, and a plug threaded into said internally threaded opening and closing the inner end of said shell.

6. A spring clamp device according to claim 1, in which the outer head is of elongated shape and is attached by two spaced arms to the open end of said shell; said shell having an internally threaded opening in its inner end for admitting said counter head, a plug threaded in said opening and closing the inner end of said shell, said counterhead having a convex end extending through the restricted open end of said shell; said helical spring interposed between said counter-head and said plug and biasing said counter-head towards the restricted end of said shell, thus allowing same to protrude towards said outer head.

7. A spring clamp device according to claim 1, in which the outer head is attached by two spaced arms to the open end of said shell; said shell having a bore which is restricted at its end facing said head and is threaded at the opposite end; said counter head having a convex end protruding through the restricted open end of said shell; said shell having an internally threaded opening in the inner end thereof for admitting said counterhead and spring, a plug threaded into said opening and compressing said spring against said counterhead, said socket being closed at its bottom, and said outer head having at its lower part a resilient member which bears on the bottom of the socket.

8. A spring clamp device according to claim 7 in which the outer head is of elongated shape and is provided with an axial bore having a restricted lower end and a threaded upper end; said resilient member comprising a plunger member inserted in said bore and having a reduced end protruding through the restricted lower end of said bore; a helical spring inserted in said bore behind said plunger and a screw member closing the upper end of said bore and compressing said spring.

9. A spring-clamp device according to claim 1 wherein said cylindrical shell comprises an outer cylinder and an inner shell telescoped in said cylinder; a bored hub protruding radially from said cylinder; a threaded hole in the shell adapted to register with the bore of said hub, and a screw passing through the said hub bore and screwed into the tapped hole of said shell.

10. A spring-clamp device for removably securing a dental prosthesis to an anchoring member permanently fixed to a pillar tooth and having an elongate vertically disposed socket and a slot in communication with and extending longitudinally of the socket, said device comprising a cylindrical shell adapted to be permanently fixed to the prosthesis, said shell being open at its outer end and closed at its inner end, an outer clamping head adapted to slidably fit in the socket of the anchoring device, a shank on said outer head extendable through the socket slot and extending into said shell through the open end thereof, a counter-clamping head slidably mounted within said shell and on said shank, means removably mounted on the outer end of said shell restricting the open end of said shell to retain a portion of said counterhead in said shell with the clamping portion of said counterhead extending beyond the end of said shell, an abutment on said shank intermediate the end thereof, a spring enclosed within said shell and interposed between said abutment and counterhead and biasing said counterhead outwardly of said shell and said outer head toward said shell, and a second lighter spring in said shell between said abutment and the inner end of said shell, whereby said heads are resiliently pressed toward each other to clamp therebetween the opposite sides of the walls of the anchoring member defining the slot.

11. A spring-clamp device for removably securing a dental prosthesis to an anchoring member permanently fixed to a pillar tooth and having an elongate vertically disposed socket and a slot in communication with and extending longitudinally of the socket, said device comprising a cylindrical shell adapted to be permanently fixed to the prosthesis, said shell being open at its outer end and closed at its inner end, an outer clamping head adapted to slidably fit in the socket of the anchoring device, a shank on said outer head and adapted to pass through said socket slot and inserted into said shell through the open end thereof, a counterclamping head slidably mounted within said shell and on said shank, grooves within said shell at the outer end of said shell, a retainer removably mounted in said grooves and restricting the open end of said shell to retain said counterhead in said shell with the clamping portion of said counterhead extending beyond the end of said shell, an abutment on said shank, and a spring enclosed within said shell interposed between said abutment and counterhead and biasing said counterhead outwardly of said shell, whereby said heads are resiliently pressed toward each other to clamp therebetween the opposite sides of the walls of the anchoring member defining the slot.

12. A spring-clamp device for removably securing a dental prosthesis to an anchoring member permanently fixed to a pillar tooth and having an elongate vertically disposed socket and a slot in communication with and extending longitudinally of the socket, said device comprising a cylindrical shell adapted to be permanently fixed to the prosthesis, said shell being open at its outer end and closed at its inner end, an outer clamping device, a counterclamping head constituted by a plunger slidably mounted within said shell and having a spherical outer clamping portion, means at the outer end of said shell restricting the open end of said shell to retain said counterhead in said shell witht the spherical clamping portion extending through the open end of said shell, a spring enclosed within said shell and biasing said counterhead outwardly of said shell, and means fixed with said outer head and passing through said slot and connecting said outer head with said shell, whereby said heads are resiliently pressed toward each other to clamp therebetween the opposite sides of the walls of the anchoring member defining the slot.

13. A spring-clamp device for removably securing a dental prosthesis to an anchoring member permanently fixed to a pillar tooth and having an elongate vertically disposed socket and a slot in communication with and extending longitudinally of the socket, said device comprising a cylindrical shell adapted to be permanently fixed to the prosthesis, said shell being open at its outer end and closed at its inner end, an outer clamping head adapted to slidably fit in the socket of the anchoring device, a pair of arms on said outer head adapted to extend through the socket slot and fixed to the outer end of said shell in straddling relation to the open end thereof, a counterclamping head constituted by a plunger slidably mounted within said shell and having a spherical outer clamping portion, means at the outer end of said shell restricting the open end of said shell to retain said counterhead in said shell with the spherical clamping portion extending through the open end of said shell between said arms, and a spring enclosed within said shell and biasing said counterhead outwardly of said shell, whereby said heads are resiliently pressed toward each other to clamp therebetween the opposite sides of the walls of the anchoring member defining the slot.

References Cited in the file of this patent

UNITED STATES PATENTS 2,688,799    Fluckiger et al.          Sept. 14, 1954

FOREIGN PATENTS 516,832    Belgium                Jan. 31, 1953